United States Patent [19]

Kollberg

[11] Patent Number: 5,493,988
[45] Date of Patent: Feb. 27, 1996

[54] APPARATUS FOR FURLING SAILS ON SAIL BOATS

[75] Inventor: Urban Kollberg, Hisings Backa, Sweden

[73] Assignee: Selden Mast AB, Vastra Frolunda, Sweden

[21] Appl. No.: 335,863

[22] PCT Filed: Jun. 2, 1992

[86] PCT No.: PCT/SE92/00372

§ 371 Date: Nov. 11, 1994

§ 102(e) Date: Nov. 11, 1994

[87] PCT Pub. No.: WO93/24362

PCT Pub. Date: Dec. 9, 1993

[51] Int. Cl.$^6$ ........................................... B63H 9/04
[52] U.S. Cl. ............................................... 114/106
[58] Field of Search ................................ 114/102, 106, 114/107, 109, 39.1

[56] References Cited

U.S. PATENT DOCUMENTS

| | | | |
|---|---|---|---|
| 3,608,511 | 9/1971 | Katshen | 114/106 |
| 4,061,101 | 12/1977 | Cook | 114/107 |
| 4,924,795 | 5/1990 | Ottemann | 114/107 |

FOREIGN PATENT DOCUMENTS 2226800  7/1990  United Kingdom ............ 114/106

*Primary Examiner*—Jesus D. Sotelo
*Attorney, Agent, or Firm*—Dvorak and Traub

[57] ABSTRACT

The present invention relates to an arrangement for a driving device for sails on a boat and comprises a worm gear acting between the driving device and a sail furling stay and/or sail furling shaft on the mast. In order, amongst other things, to obtain a compact driving unit, and thus to reduce the space requirements on board the boat in question, the driving device is accommodated internally within a space in the worm gear, inside its worm gear screw, with the driving device arranged coaxially with the screw.

14 Claims, 5 Drawing Sheets

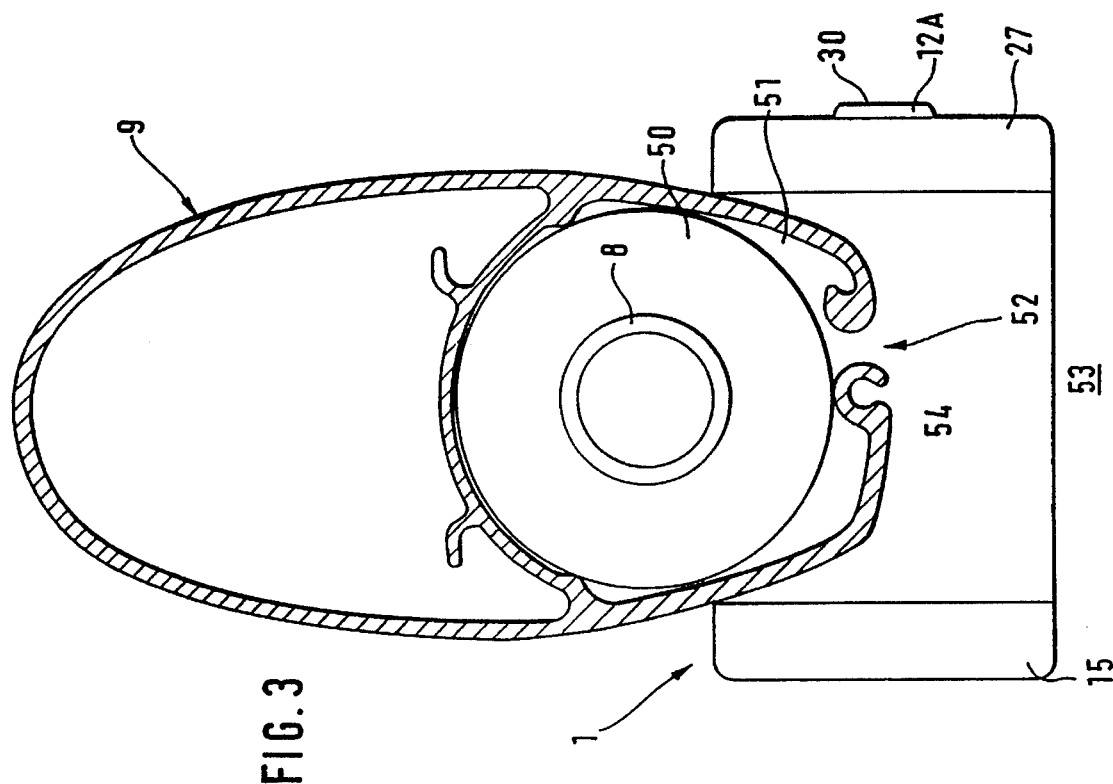
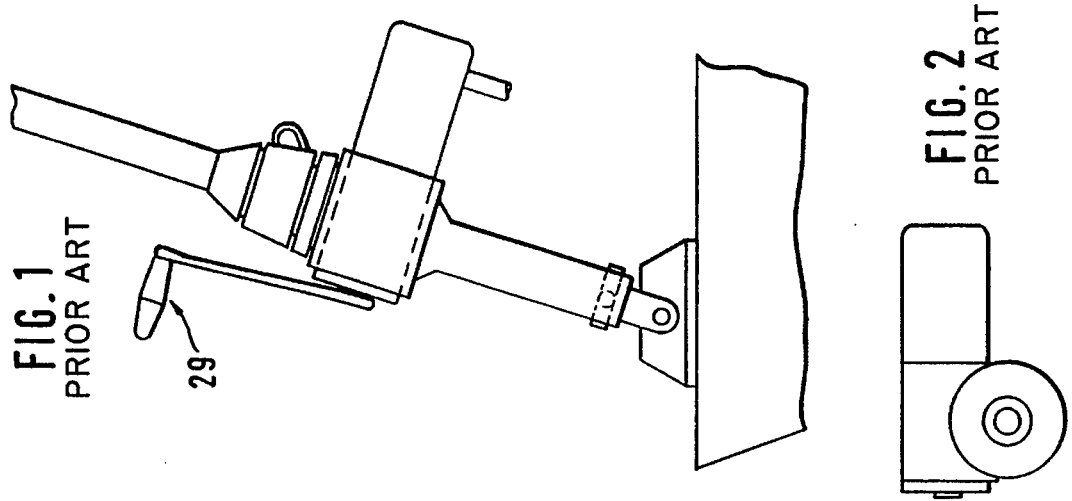

APPARATUS FOR FURLING SAILS ON SAIL BOATS

The present invention relates to an arrangement for a driving device for sails on a boat and comprises a worm gear acting between the driving device and a sail furling stay and/or a sail furling shaft on the mast.

BACKGROUND OF THE INVENTION

In previously disclosed driving arrangements for the mechanical furling and unfurling of sails on boats, the arrangement is bulky because it is attached either longitudinally to the driving device, i.e. in such a way that an hydraulically or electrically powered motor, for example, is connected to the screw of a worm gear at one end, or laterally because of drive motors and worm gear screws arranged in parallel with one another at the transmission device. The presence of such projecting parts close to the mast and/or stays on boats has been found to be a major disadvantage, since they have often presented the risk of injury to crew members as they pass by. The mass of the arrangement can also be considerable.

U.S. Pat. No. 3,608,511 shows a boom turning device comprising a worm gear mechanism in which a crank hole in a worm screw is intended to accommodate the end of a crank for driving the arrangement when turning the sails, whilst GB A 2,226,800 shows a sail driving arrangement which, likewise with a driving unit in the form of an electric motor, is accommodated with one part in a worm gear screw, more specifically in the gear casing.

The principal object of the present invention is thus, in the first instance, to make available a solution to this problem using simple and effectively functioning means.

Said object is achieved by means of an arrangement in accordance with the present invention, which is characterized essentially in that the driving device, which consists of an hydraulic motor, is capable of being accommodated with at least one part in an internal space in the screw of the worm gear.

BRIEF DESCRIPTION OF THE DRAWINGS

The invention is described below as a preferred illustrative embodiment, in conjunction with which reference is made to the drawings, in which FIGS. 1 and 2 illustrate schematically examples of a previously disclosed driving arrangement for a foresail, shown respectively from the side and from above;

FIG. 3 illustrates schematically an example of a driving arrangement in accordance with the present invention on the mast of a boat, shown looking across the longitudinal sense of the mast;

DETAILED DESCRIPTION OF THE INVENTION

Figure 4:
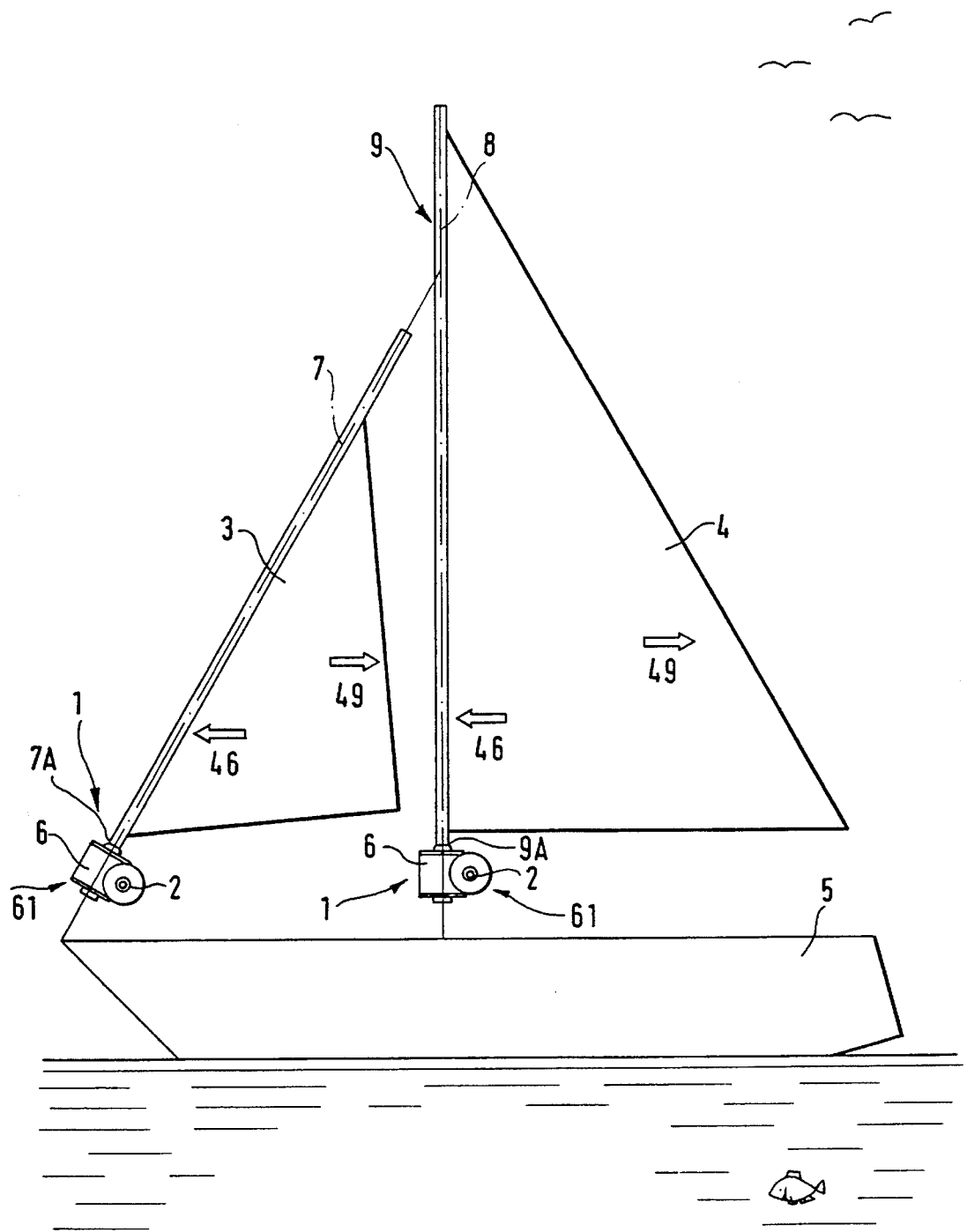
FIG. 4 shows the basic arrangement in accordance with the present invention.
Figure 5:
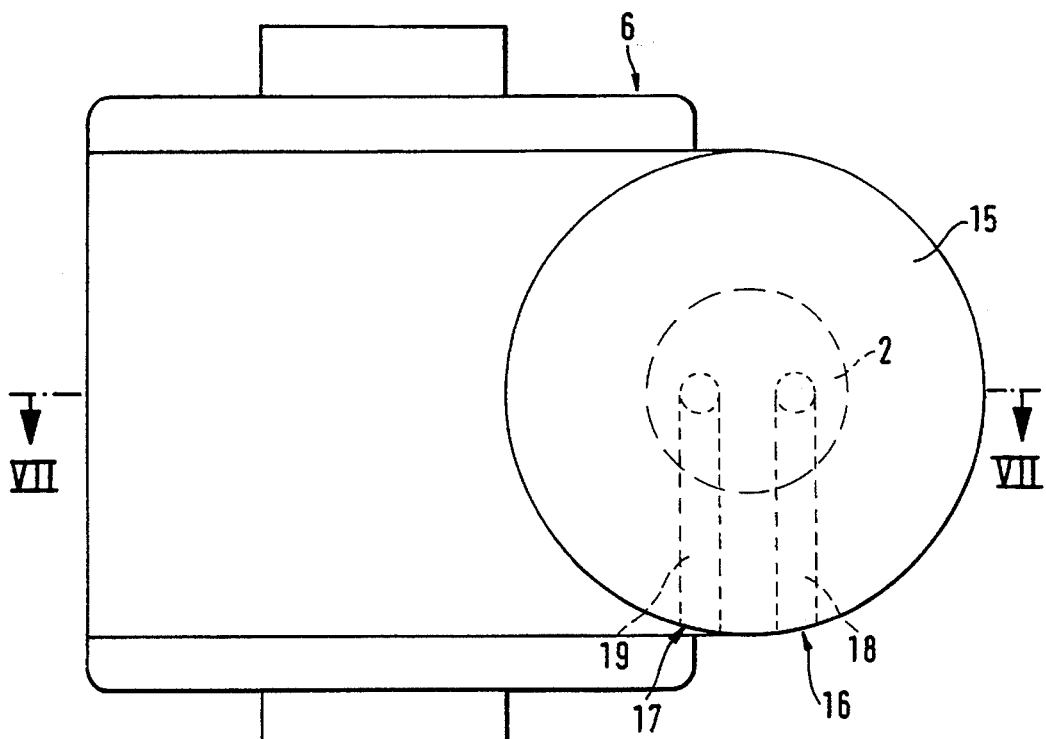
FIGS. 5–6 show side views of drive arrangements in accordance with the invention.
Figure 6:
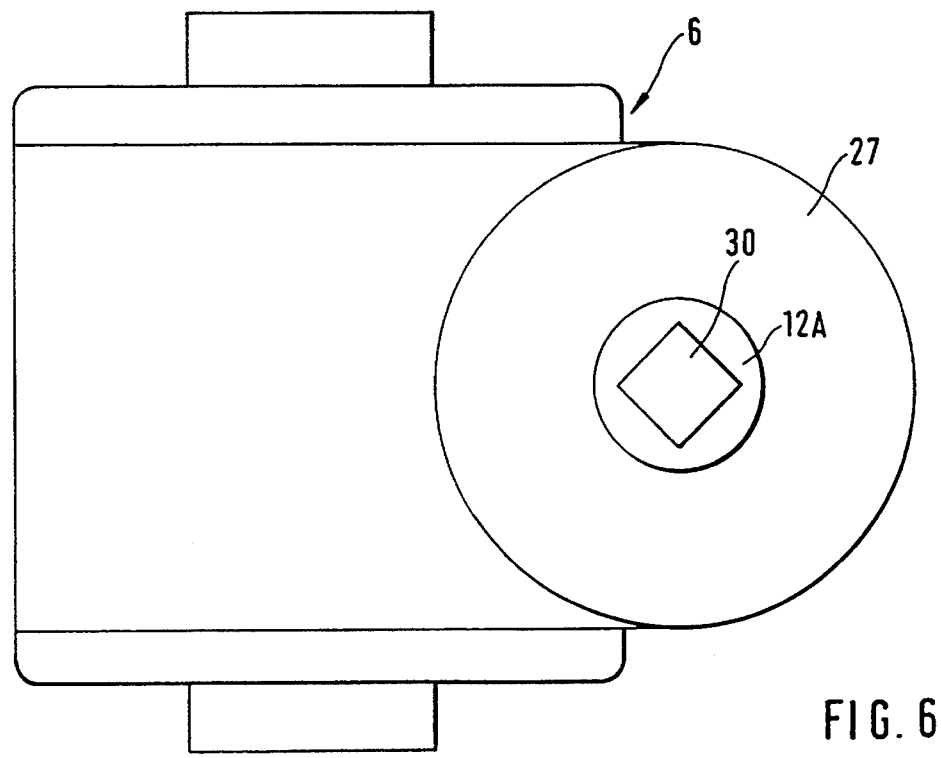
Figure 7:
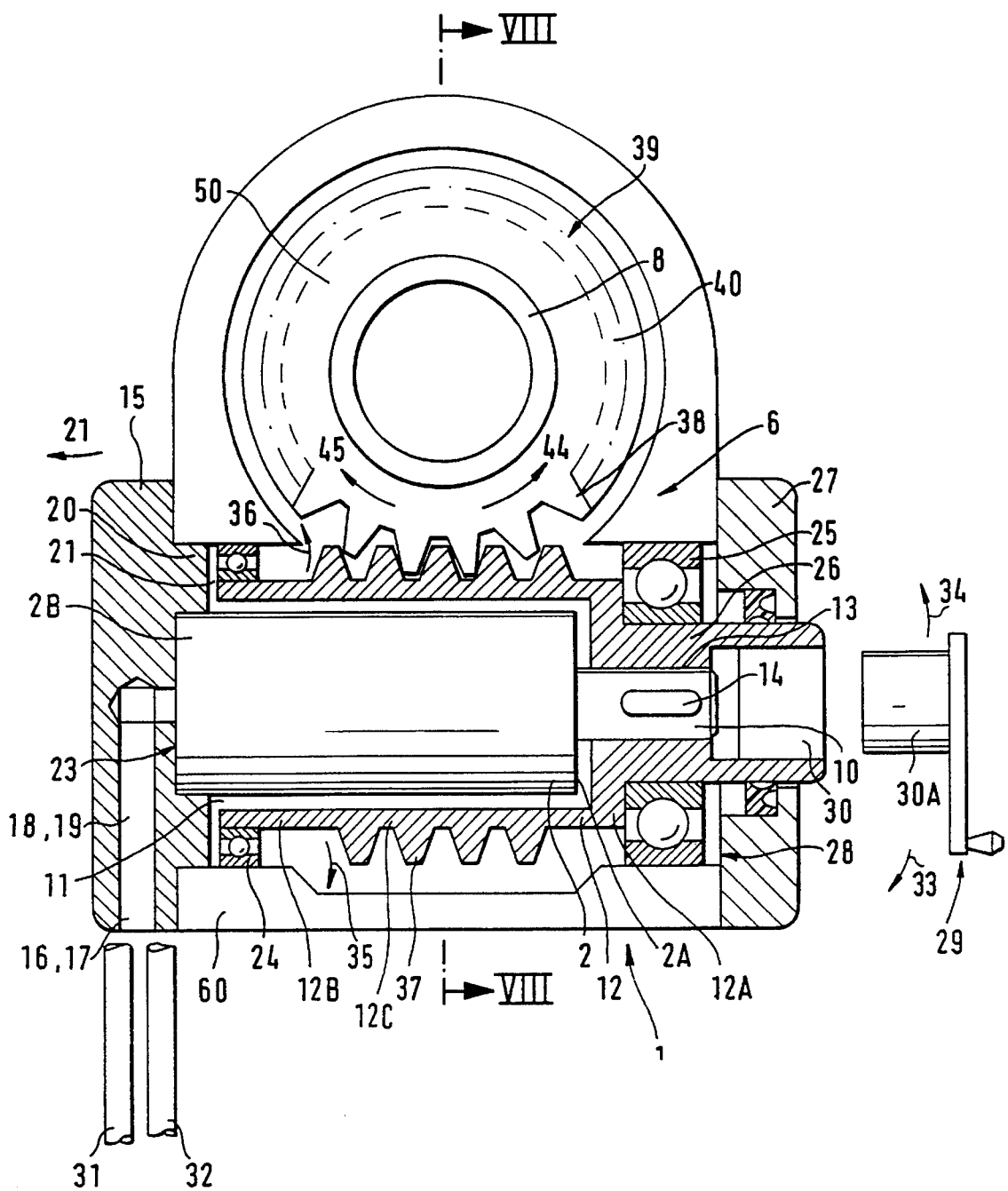
FIG. 7 shows a schematic sectioned view of the driving arrangement, essentially along the line VII—VII in FIG. 5.
Figure 8:
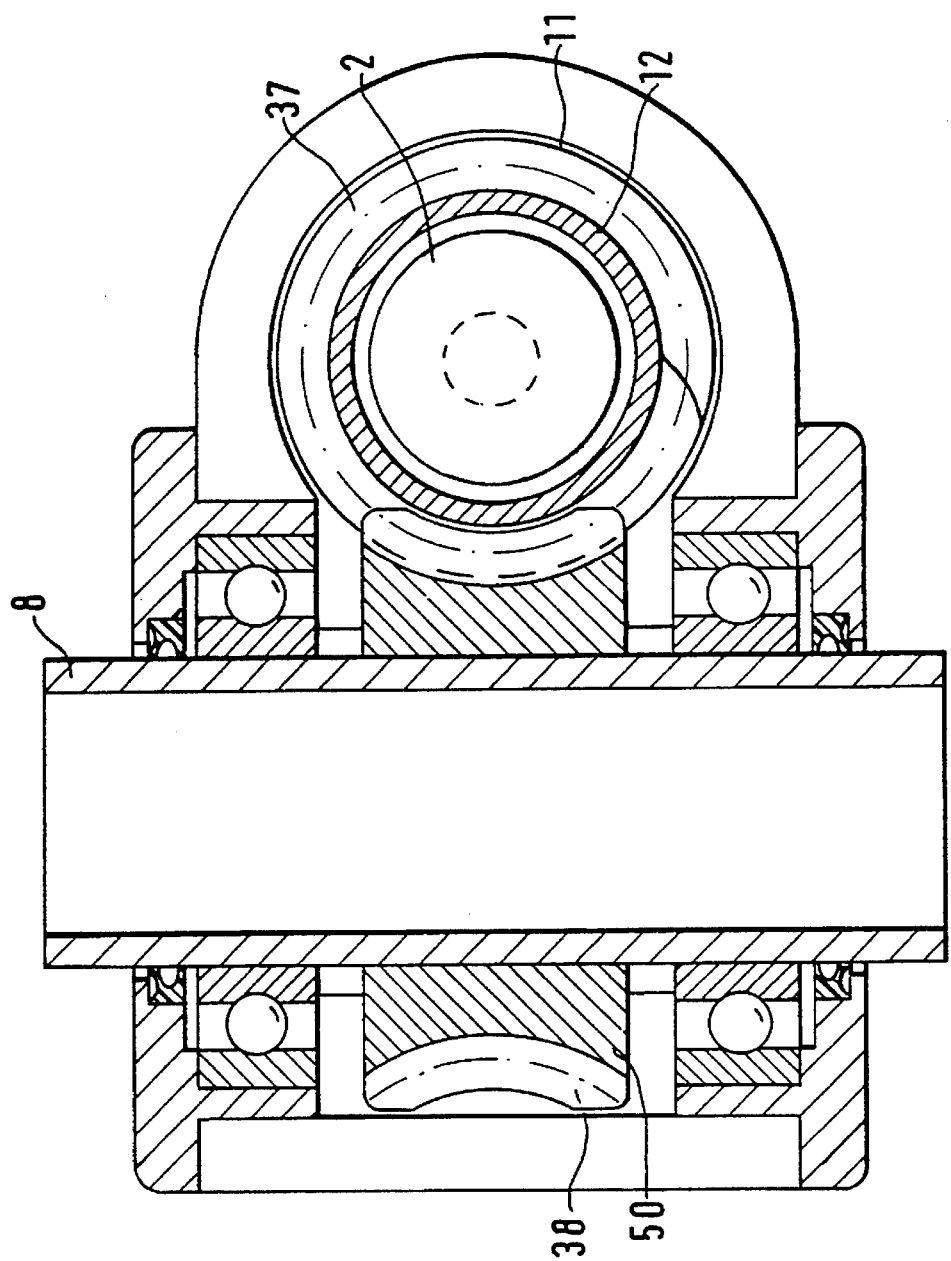
FIG. 8 shows a sectioned view along the line VIII—VIII in FIG. 7.

An arrangement 1 for a driving device 2 for sails 3, 4 on a boat 5 comprising a worm gear 6, which is intended and so arranged as to be capable of acting between the intended driving device 2 and an intended sail furling shaft, more specifically a sail furling stay 7 and/or a sail furling shaft 8 on a mast 9, has said driving device 2 so arranged as to be capable of being accommodated internally within said worm gear 6.

The driving device, which consists of an hydraulic motor 2, which exhibits an output drive shaft 10, preferably at its one front end 2A, is so arranged, preferably in its entirety, but at least in some part, as to be accommodated in an internal space 11 within the screw 12 of said worm gear.

In the illustrative embodiment of the invention shown in the drawings, the driving end 10 of the hydraulic motor with its shaft is capable of being introduced into an internal and preferably transcurrent axially extending cavity 13 in said screw 12 in order to interact with a drive transmission part 14, for example a keyed joint, etc., in the worm gear screw arranged internally within the cavity 13. In this way torsional power transmission moment can be transmitted from the hydraulic motor 2 via the drive shaft 10 to the screw 12 at its one end 12A. Retention of the hydraulic motor 2 in its intended accommodating space 11 in the screw 12 can be achieved effectively by the hydraulic motor 2 being mounted at its rear end 2B, i.e. by the motor 2 being secured, for example bolted and centralized at said rear end 2B, contrary to what is normally the case for such hydraulic motors 2, the mounted end of which according to the prior art is at the motor shaft end 2A. A covering part 15 is so arranged as to be secured to the hydraulic motor 2, in order to prevent it from rotating when it is actuated. One end 12B of the worm gear screw is open at its end facing away from its drive shaft 10, in order to permit the motor 2 to be introduced through the opening. The end wall cover 15 thus functions not only as a mounting flange, but it also replaces the rear wall of the motor. The advantages of this are that the design is more compact than in previously disclosed designs, and that the connection lines 31, 32 for hydraulic fluid can be routed radially outwards from the motor 2 and the cover 15, which, amongst other things, facilitates the positioning of the motor inside the screw 12 in the space 11 provided therein, and permits a small screw diameter to be achieved.

One possible alternative involves arranging a tube externally around the motor inside a screw projecting through the open end of the screw in order to secure the motor at its front.

This covering part 15 exhibits a number of openings 16, 17 together with transport channels 18/19 extending as far as the respective opening and preferably radially into the covering part 15, which transport channels are so arranged as to supply and carry away hydraulic fluid for the hydraulic motor 2.

Anchoring of the hydraulic motor 2 inside the screw 12 can take place, for example, by means of a screwed connection or in some other appropriate fashion with means arranged for the purpose.

The end wall cover 15, which can be so arranged as to be capable of being bolted both to the motor 2 and to a frame 60, is so arranged as to be capable of being guided by a guide ring 20, which is suitably so arranged as to act between said end wall cover 15 and the worm gear screw 12 in a space 21 outside the motor 2 in a radial sense. Said guide ring 20 encloses the rear end 2B of the hydraulic motor 2 and is attached laterally 21 and preferably securely to the essentially flat side 23 of the end wall cover 15. A bearing 24 connected to the worm gear screw 12 acts against said frame 60 internally therein.

As an alternative, a loose guide ring can be so arranged as to be attached around the motor 2 and to interact with the covering part 15 for centralizing the motor 2 and guiding the covering part 15. The motor 2 is guided in this way in relation to the screw 12 and is secured to the end wall 15 via the rear end 2B of the motor, which end wall 15 is integrated into the design of the motor in question.

Externally the worm gear screw 12 exhibits along its front end 12A a collar 26 arranged with a reduced width and adapted for the accommodation of a bearing 25 thereon, in the area around the internal drive transmission part 10. The bearing 25 is fixed axially to the screw 12 and to the frame 60 in order to be able to absorb axial forces in both directions. This permits optional sail furling in either a clockwise or an anti-clockwise direction.

The front end 12A of the worm gear screw also extends through a front cover plate 27, which, like the rear cover plate 15, also exhibits a plane contact part 28, inside which the relevant bearing 25 acts against the frame 60. Manual engagement of the sail turning function in possible emergency situations is permitted through the engagement in a previously disclosed fashion of, for example, a crank 29 for the actuation via manual drive of the worm gear screw 12 via an appropriately shaped crank handle 30, 30A. By using a valve to switch over the hydraulic lines 31, 32 which lead to the hydraulic motor 2 respectively for the supply and return of hydraulic fluid to and from the motor 2, and by connecting the lines together, these are connected to form a circuit, and by actuating the crank 29 in either direction of rotation 33, 34, hydraulic fluid in said circuit is allowed to circulate at the same time as the screw 12 is rotated freely in the desired direction of rotation 35, 36.

Normal actuation of the driving device 2 by the supply of hydraulic fluid to the driving device 2, from an hydraulic pump not shown in the drawings, causes the drive shaft 10 to rotate in either direction of rotation 35, 36 in order, via a keyed joint 14, to transmit torque to the screw 12 and its driving screw part 37 which extends along the outer periphery 12C. Said driving screw part 37 interacts in turn, in a previously disclosed fashion via a worm gear, with gears 38 which are arranged along the periphery 39 of a worm gear wheel ring gear 40 included in the worm gear 6, the gears 38 of which ring gear are in contact with and interact with the driving screw part 37.

The worm gear wheel ring gear 40 is also attached in such a way that it rotates a sail furling shaft 8 on a mast 9 and/or a sail furling stay 7, so that, as said ring 40 is rotated under the driving effect of the hydraulic motor 2 and the screw 12 in either direction 44, 45, the shaft 8 / stay 7 is caused to furl in 46 the sail 4, 3 or to unfurl 49 the sail.

In the case of a mast 9, the gear 6 and the associated driving device 2 are suitably attached to the lower end 9A of the mast, wherein the worm gear wheel ring 40, the sail furling shaft 8 and the connection 50 between same are preferably capable of being accommodated internally in a suitable sail accommodating space 51 extending in the longitudinal sense of the mast so as to permit the sail 4 to extend through a slot-shaped opening 52 which leads between said space 51 and the area 53 around the mast 9 at its rear part 54.

In the case of a stay 7, which is intended to function as a furling shaft for a foresail 3, etc., the arrangement 1 together with its accessories are arranged at the lower end 7A of the stay, and the worm gear wheel ring of the worm gear is attached to the stay 7 via a suitable connection.

Such an effectively functioning, compact and simple driving arrangement 61 for sails 3, 4 on a boat 5 is achieved thanks to the present invention, the function and composition of which will have been appreciated from the foregoing and from the example shown in the drawings.

I claim:

1. An apparatus for furling sails on a furling device of a boat, the apparatus comprises: a worm gear having an internal space, the worm gear coupled to the furling device; a driving device for driving the worm gear, the driving device at least partially accommodated in the internal space of the worm gear, wherein the driving device drives the worm gear coupled to the furling device to furl the sail on the furling device.

2. An apparatus in accordance with claim 1, wherein the driving device has a driving end with a shaft coupled to an internal drive transmission part of the worm gear.

3. An apparatus in accordance with claim 2, wherein the worm gear has a reduced width collar for accommodating a mounting bearing.

4. An apparatus in accordance with claim 1, wherein the driving device is a hydraulic motor mounted at a rear end thereof.

5. An apparatus in accordance with claim 4, further comprising a rear end wall cover coupled to the rear end of the hydraulic motor, the end wall cover being mountable to a frame.

6. An apparatus in accordance with claim 5, wherein the end wall cover includes openings with radial transport channels for providing fluid to the hydraulic motor.

7. An apparatus in accordance with claim 5, further comprising a guide ring attached to the rear end wall cover for mounting the hydraulic motor.

8. An apparatus in accordance with claim 7, wherein the guide ring encloses and aligns the rear end of the hydraulic motor and is attached to the end wall cover.

9. An apparatus in accordance with claim 1, wherein a front end portion of the worm gear extends through a front cover plate, the front end portion engageable with an external auxiliary drive means for driving the worm gear.

10. An apparatus accordance with claim 9, wherein the external drive means for driving the worm gear is a crank.

11. An apparatus in accordance with claim 1, wherein the worm gear is open at one end to permit introduction of at least a portion of the driving device in the internal space, the driving device enclosed by cover plates at respective ends portions wherein the driving device is in coaxial alignment with the worm gear.

12. An apparatus in accordance with claim 1, further comprising a bearing disposed between the worm gear and a frame to absorb axial forces permitting optional sail furling in either a clockwise or an anti-clockwise direction.

13. An apparatus in accordance with claim 1, wherein the furling device is a furling shaft.

14. An apparatus in accordance with claim 1, wherein the furling device is a furling stay.

\* \* \* \* \*